United States Patent [19]

Savello

[11] Patent Number: 5,753,294
[45] Date of Patent: May 19, 1998

[54] METHOD FOR MANUFACTURING ICE CREAM MIXES BY REVERSE OSMOSIS CONCENTRATION AND ULTRA-HIGH TEMPERATURE PROCESSING

[75] Inventor: Paul A. Savello, Hyde Park, Utah

[73] Assignee: Utah Milk Technologies, L.C., Delta, Utah

[21] Appl. No.: 695,696

[22] Filed: Aug. 12, 1996

[51] Int. Cl.$^6$ .................................................. A23C 1/00
[52] U.S. Cl. .......................... 426/580; 426/565; 426/569; 426/587; 426/492; 426/522
[58] Field of Search .................................. 426/564, 565, 426/569, 572, 580, 587, 586, 490, 491, 492, 520, 521, 522

[56] References Cited

PUBLICATIONS

Donald et al., 88(08):V0099 FSTA, abstracting GB 2191676.
Honer, C., 84(03):F0161 FSTA, abstracting Dairy Record, 1983, 84(6), 74–76, 78, 80.
Sorensen, J.J., 80(07):P1231 FSTA, abstracting Nordisk Mejeriindustri, 1979, 6(9), 442–444.
Steen Hansen, M., 80(07):P1228 FSTA, abstracting Nordisk Mejeriindustri, 1979, 6(9), 434–436.

*Primary Examiner*—Leslie Wong
*Attorney, Agent, or Firm*—K. S. Cornaby

[57] ABSTRACT

Methods are disclosed for the manufacturing of concentrated and commercially-sterile forms of ice cream mix that can be stored at room temperature for several months without microbiological, physical, or chemical changes. Reverse osmosis concentration of fat-adjusted milk creates the milk concentrate with the appropriate and desired fat and nonfat milk solids levels. Food substances/additives that are desired in the final ice cream product are added at appropriate level(s) to the concentrated milk to produce an ice cream mix. The ice cream mix is ultra-high temperature processed and aseptically-packaged to create a commercially-sterilize ice cream mix that can be stored at room temperature until use in the manufacture of ice cream products.

8 Claims, 1 Drawing Sheet

METHOD FOR MANUFACTURING ICE CREAM MIXES BY REVERSE OSMOSIS CONCENTRATION AND ULTRA-HIGH TEMPERATURE PROCESSING

FIELD OF THE INVENTION

The invention relates to a improved method to concentrate and heat-process milk and ice cream ingredients to commercial sterility for use in the manufacture of ice cream and ice cream-like frozen products. The concentrated, commercially-sterile milk/ice cream mix can keep at room temperature for several months without physical or chemical changes. The concentrated, commercially-sterile milk/ice cream mix will have the desired composition of constituents so that it will be ready to use by the ice cream manufacturer. Specifically, the method comprises concentrating milk, which is adjusted to appropriate and desired levels of milk components, by reverse osmosis, addition of desired and appropriate food additives/substances used in ice cream manufacture, commercially sterilizing the blend by ultra-high temperature conditions, homogenizing the mix, aseptically packaging the concentrate/mix for room temperature storage, and using the concentrate/mix directly for ice cream manufacture.

BACKGROUND OF THE INVENTION

Ice cream is a frozen milk product manufactured by addition of appropriate and desired food additives/substances to milk that is adjusted to desired fat, nonfat milk solids, and total milk solids levels. Sweetening agents, emulsifiers, flavors, and other approved food substances can be added to give the ice cream the desired physical-chemical properties during freezing and subsequent hardening of the frozen product. The physico-chemical properties of the ice cream that are normally controlled by selection of the adjustment levels of milk components, ingredients, and processing conditions, include (but not all-inclusive) overall flavor, mouthfeel, texture, ice crystal size, extent of air incorporation ("overrun"), meltability, graininess, emulsification level, and surface appearance.

Ice cream can be manufactured by many different methods and procedures. A general outline of traditional ice cream manufacture is described below.

Milk is standardized to a desired fat level by addition or removal of fat from the raw milk.

Nonfat milk solids can be increased from the 9% level generally found in raw milk to 10% or higher by addition of a source of non fat milk solids (e.g. nonfat dry milk, concentrated skim milk).

Addition of sugar and other sweetening agents, flavor additives, stabilizer(s) (or other thickening agents), emulsifier(s) to the fat- and nonfat milk solids-adjusted milk.

The adjusted and additives-containing milk (called the "ice cream mix") is heat-treated by any of several methods to legally pasteurize the mix.

The ice cream mix is cooled to refrigeration temperature following pasteurization and is allowed to "age" at refrigeration temperature for a minimum of four (4) hours. (This "aging" step is not a requirement; however, "aging" of the ice cream mix after pasteurization and before freezing produces an ice cream with improved physicochemical properties.)

The ice cream mix is frozen either in batch or in continuous process systems. During freeing, the ice cream mix is agitated while heat is removed from the mix in order to freeze water in the ice cream mix to ice crystals. Generally, fast freezing of the ice cream mix is preferred, due to this process yielding small ice crystal size in the final product.

The frozen ice cream (upon discharge from the ice cream freezer) is packaged and placed in a "hardening room" in which the ice cream undergoes further freezing of water to ice crystals. The hardening room can have a temperature of −30° to −40° C. as an example.

Although it has been known in the art to concentrate milk to increase the total and nonfat milk solids for ice cream manufacture by various water removal technologies, such as reverse osmosis, evaporation, freeze concentration, and mechanical vapor recompression, is membrane, the prior art has not dealt with a process that includes the ultra-high temperature processing of the milk concentrate/ice cream mix additive blend, followed by aseptic packaging and nonrefrigerated storage for long time periods. The invention comprises reverse osmosis concentration of the fat- and nonfat milk solids-adjusted milk, addition of desired and appropriate substances (e.g. emulsifiers, stabilizers, sweetening agents, coloring agents, flavors), ultra-high temperature processing of the ice cream mix, aseptic packaging, and long-term, non-refrigerated storage of the ice cream mix. The ice cream mix so prepared and processed can be manufactured directly to ice cream by appropriate freezing of the nonrefrigerated, stored ice cream mix.

SUMMARY OF THE INVENTION

The present invention relates to the process to concentrate fat- and nonfat milk solids-adjusted milk by reverse osmosis and heat process the concentrate at ultra-high temperatures to produce ice cream mix for ice cream manufacture. Appropriate and desired food additives/substances such as emulsifiers, stabilizers, sweetening agents, flavors, and other approved agents can be added to the milk concentrate prior to ultra-high temperature processing to commercially sterilize the complete ice cream mix. The ice cream mix is aseptically packaged for long-term nonrefrigerated storage.

The concentrated, commercially-sterile ice cream mix gives the ice cream manufacturer a more convenient and uniform "raw" material with which to manufacture the finished ice cream/frozen product. The ice cream mix will eliminate the need for an ice cream manufacturer to hold inventories of many different raw materials/ingredients. The ice cream manufacturer can order and receive custom-designed ice cream mixes that are shelf-stable (i.e. nonrefrigerated) and commercially-sterile. This is important for many reasons:

The ice cream manufacturer can hold in nonrefrigerated inventory storage large volumes of the concentrated, commercially-sterile ice cream mixes without fear that the mixes will spoil due to unwanted microorganism growth.

The ice cream manufacturer will not have to hold in inventory many different ingredients or additives, but rather receive "just in time" the concentrated, commercially-sterile ice cream mix blend.

The ice cream manufacturer will not have to "adjust" in any way (by addition or subtraction of any mix constituents) the ice cream mix because the ice cream mix will be prepared and processed to commercial-sterility as a "ready to use" blend.

The ice cream manufacturer will not have to give the ice cream mix any additional heat treatment (e.g.

pasteurization) in the ice cream facility because the received ice cream mix will be commercially-sterile.

The production process for concentrating, blending, heat processing, and packaging the inventive concentrated, commercially-sterile ice cream mix involves the separation of water from the fat-adjusted and nonfat milk through reverse osmosis (RO) membranes until the desired fat, nonfat milk solids, and total milk solids levels are achieved. Appropriate food additives/substances can be added to the concentrated milk, such as emulsifiers, stabilizers, flavors, sweetening agents, and other desired/approved ingredients. This ice cream mix is ultra-high temperature (UHT) processed to commercially-sterilize the mix. The mix is aseptically packaged into containers as desired by the ice cream manufacturer specifications.

The ice cream mix has the advantage of being a "ready to use" ice cream mix per the ice cream manufacturer specifications. All ingredients and components in the mix (milk and others) are commercially-sterilized giving the maximum level in safety to the ice cream manufacturer.

There is an increasing demand by food manufacturers to reduce their overall cost structure to be able to competitively participate in the food marketplace. An ice cream manufacturer can compete optimally in the marketplace when the manufacturer concentrates on what it does "best"—produce ice cream and ice cream-like frozen products. Shifting the burden of raw materials reception, inventory, blending, processing, packaging, and transportation to a supplier of a ready-to-use, "just in time" ice cream mix permits the ice cream manufacturer to concentrate in making ice cream, while the supplier can concentrate and perform optimally in preparing the desired and specified raw material ice cream mix.

This inventive process removes only pure water from the fat-adjusted, non fat milk solids-adjusted, and total milk solids-adjusted milk and leaves the exact proportion of all milk components (protein, fat, minerals, vitamins, carbohydrates) as in the originally-adjusted milk.

The disadvantages of prior and traditional processes in ice cream manufacture include: a cooked flavor imparted to ice cream when concentrated milk that has been evaporated is used to increase the nonfat milk or total milk solids of the ice cream mix; a powdery flavor imparted to ice cream when nonfat milk powder is used to increase the non fat milk solids of the ice cream mix; presence of microorganisms in the ice cream mix due to nature of incomplete destruction of these microorganisms in the traditional pasteurization process.

Accordingly, the inventive process provides a process to produce concentrated, commercially-sterile ice cream mix comprising the following steps:

(a) concentrating fat-adjusted, nonfat milk solids-adjusted, and total milk solids-adjusted milk by reverse osmosis;

(b) addition to the concentrated, adjusted milk of desired and specified food additives/substances used in ice cream manufacture such as emulsifiers, stabilizers, sweetening agents, flavors, and other approved ingredients;

(c) commercially sterilizing the ice cream mix at ultra-high temperature; and (d) aseptically packaging the ice cream mix under appropriate sterile conditions.

The commercially-sterile and aseptically-packaged ice cream mix can be used immediately by the ice cream manufacturer. No additional ingredient(s) addition, nor additional heat treatment(s) need be given to the ice cream mix prior to ice cream manufacture.

THE DRAWING

A preferred embodiment of the invention is illustrated on the accompanying drawing, in which:

FIG. 1 is a Flow Chart of Ice Cream Mix Preparation Using RO/UHT Processed Milk.

DETAILED DESCRIPTION OF THE INVENTION

Figure 1:
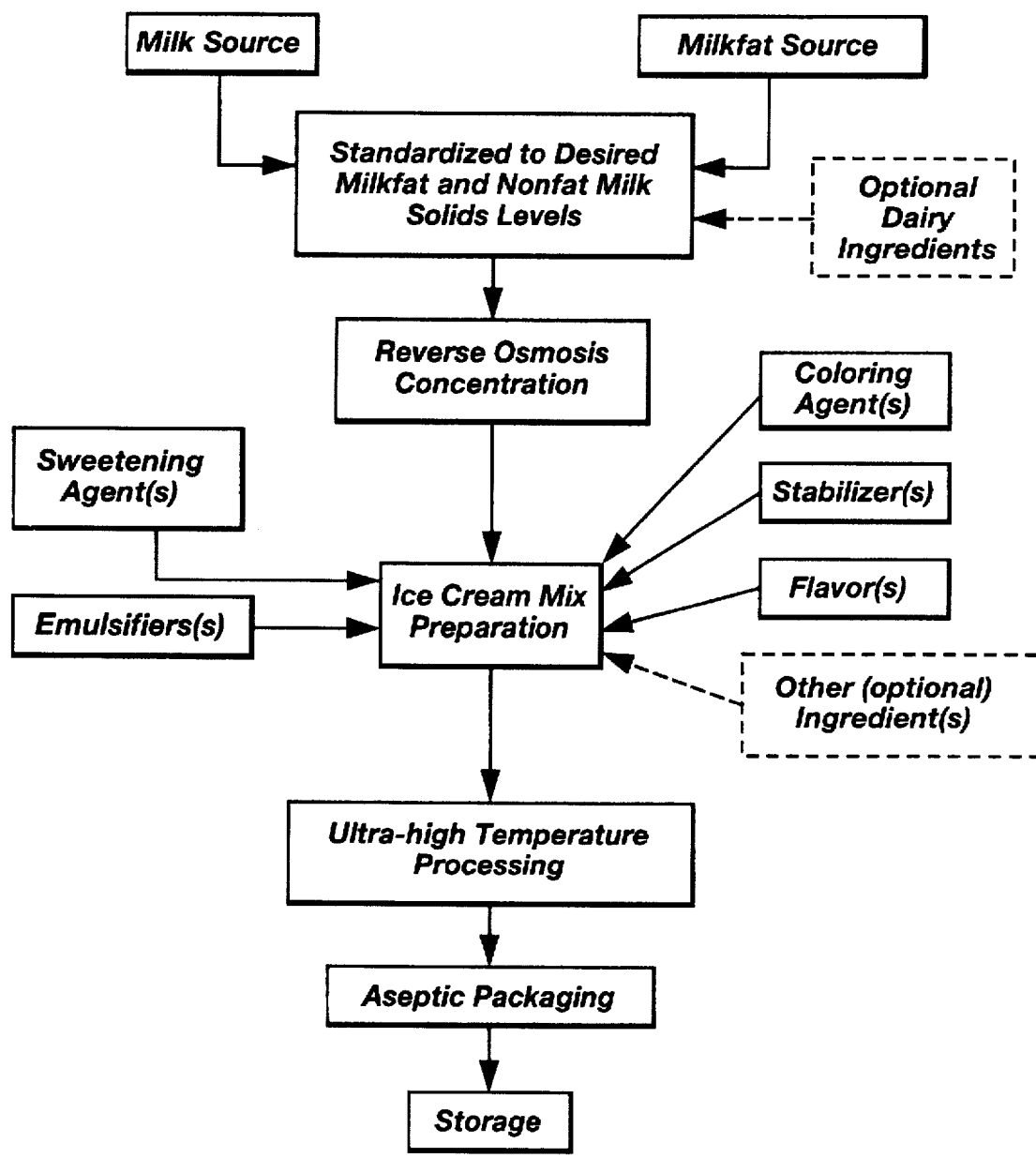

The present invention is a process to make commercially-sterile, concentrated ice cream mix from fresh milk, cream, and other approved milk ingredients with desired additives/substances for ice cream manufacture. The invention comprises: (a) concentrating fat-adjusted, nonfat milk solids-adjusted, and total milk solids-adjusted milk by reverse osmosis; (b) addition to the concentrated, adjusted milk of desired and specified food additives/substances used in ice cream manufacture such as emulsifiers, stabilizers, sweetening agents, flavors, and other approved ingredients; (c) commercially sterilizing the ice cream mix at ultra-high temperature; and (d) aseptically packaging the ice cream mix under appropriate sterile conditions, yielding a "ready to use" commercially-sterile ice cream mix for ice cream manufacture.

The milk, cream, and dairy ingredients to be concentrated and commercially-sterilized are adjusted to desired fat, nonfat milk solids, and total milk solids levels. For example, raw milk can have a butterfat content from 3.0 to greater than 4.0 percent. The fat content of raw milk depends on many factors, including season, breed of cows, nutritional adequacy of cows, stage of lactation, age of cows, and other factors. Whole milk (with 3% to greater than 4% fat) can be separated by a mechanical process into skim milk (fat content less than 0.5%) and cream.

The fat content of cream that is separated from milk can have a wide range, e.g. from less than 20% to greater than 40% fat. The fat level in cream depends on the separation process by which the cream was obtained. The nonfat milk solids level in the nonfat portion of cream contains the same percentage of nonfat milk constituents as in the nonfat milk portion of the whole milk from which the cream was obtained.

Appropriate calculations can be made to determine the amount of milk (skim, lowfat, whole) and cream (with a given fat percent level) that must be blended to yield a desired fat, nonfat milk solids, and total milk solids blend. Ice cream mix can be adjusted to have fat levels of 10% or greater, nonfat milk solids levels of 5% or greater, and total milk solids levels of 20% or greater. Lowfat and reduced-fat ice cream mixes can also be prepared by appropriately adjusting the milk, cream, and any other approved dairy ingredients in such manner that the fat, nonfat milk solids, and total milk solids levels are in accord with the regulations describing the compositions of these ice cream products.

The milk/cream/dairy ingredients blend is concentrated by reverse osmosis by removal of pure water from the adjusted milk. All milk components are maintained at the same relative proportion as in the originally-adjusted milk. The concentration process can proceed until the desired fat, nonfat milk solids, and total milk solids are reached. The process of removing water from adjusted milk by reverse osmosis can occur at moderately low temperatures (for example, 40° to 60° C.) thereby not imparting a cooked flavor or other off flavor(s) to the milk concentrate.

A desired ice cream mix can have a final milk solids composition of 10% fat, and 10% nonfat milk solids. Skim milk and cream (with 35% fat for example) can be mixed in such proportion and concentrated by reverse osmosis membrane that, together with added sweetening agents, emulsifier, and stabilizer ingredients at desired levels, the final ice cream mix can have 10% nonfat milk solids and 10% fat. For example, 96.8 pounds of skim milk (with 9% nonfat milk solids) and 28.6 pounds of cream (with 35% fat) can be mixed and reverse osmosis-concentrated by removal of 41.8 pounds of water. To the 83.5 pounds of concentrated milk/cream blend, sugar (16 pounds) and emulsifier/stabilizer (0.4 pounds) can be added. The resulting ice cream mix will have the desired fat (10%), nonfat milk solids (10%), total milk solids (20%), sweetening agents (16%), and emulsifier/stabilizer (0.4%) that will be ready for ultra-high temperature processing and aseptic packaging.

Other levels of cream and milk sources can be blended to give appropriate and desired levels of fat, nonfat milk solids, and total milk solids after appropriate reverse osmosis concentration with removal of the appropriate level of water from the blend.

Food additives/substances to improve overall ice cream properties are generally added to the ice cream mix before heat treatment. Emulsifiers are added to properly emulsify the fat and water phases of the ice cream mix in order that these phases do not separate during subsequent processing. Stabilizers are added to increase water holding capacity of the ice cream mix and to provide the proper interaction with other ingredients in the ice cream mix in order that air can be properly incorporated into the ice cream mix during the freezing process. Stabilizers also help in the formation of small ice crystals during the freezing process, which enhances the mouthfeel, texture, and resistance to melt properties of the product. Sweetening agents (natural or artificial) are added to reach a desire sweetness level in the finished product. The sweetening agents are also added to increase the total solids content of the ice cream mix. Flavors can be added to a desired level. These various additives/substances must be added to the concentrated milk/cream blend prior to any legal pasteurization.

The ice cream mix may be commercially-sterilized using any sterilization procedure as long as the balance of all elements of the blend except water is not adversely disturbed. It is preferable that the ice cream mix be commercially-sterilized by a continuous ultra-high temperature process wherein the ice cream mix is passed over one or more heat exchangers or is sterilized by a steam-heating process. Heating temperatures and holding times are selected as appropriate to commercially-sterilize the mix, and as appropriate to the equipment in use. A preferred ultra-high temperature and holding time combination includes 138° C. at a minimum of 2 seconds.

The inventive process offers several advantages including improved energy efficiency in the concentration and commercial-sterilization steps. Reverse osmosis membrane concentration of fluids is a very energy-efficient and cost-efficient method to remove pure water through the membrane. Another advantage is that the commercially-sterile ice cream mix does not require refrigeration during transportation and warehouse storage prior to use by the ice cream manufacturer.

The commercially-sterile ice cream mix can be aseptically packaged in a variety of package types and sizes. For example, the blend can be aseptically packaged in approved (for low acid products) flexible containers that hold up to 300 gallons (approximately one metric ton). The commercially-sterile mix in such large flexible containers can be directly pumped from the container to a desired location in the ice cream manufacturing facility.

The process of the invention is new and useful. The commercially-sterile ice cream mix can be stored at room temperature without spoilage due to contaminating microbial growth. The commercially-sterile ice cream mix can be stored at other than room temperature without adverse effects on the mix. The commercially sterile ice cream mix can be used immediately by the ice cream manufacture because the fat, nonfat milk solids, total milk solids, sweetening agents, emulsifier(s), stabilizer(s), and other desired ingredients are contained in the ice cream mix at the appropriate and desired levels.

Experimental Work Leading to the Invention

As a first step in the research that led to the invention, a non-cellulosic reverse osmosis membrane, identified as Type ZF99, was obtained from the Damrow Company of Fond du Lac, Wis. The membrane was manufactured by Patterson Candy International, Ltd.

In the example reported below, 96.8 pounds of skim milk (with 9% nonfat milk solids and 0.1% fat contents) and cream (with 35% fat and 9% nonfat milk solids in the nonfat portion of the cream) were blended and reverse osmosis-concentrated by removal of 41.8 pounds of water through the membrane. The milk/cream blend was heated to approximately 54° C. prior to reverse osmosis concentration. Heating the milk/cream blend, though not a requirement of the process, allowed the milk/cream blend to be concentrated more efficiently and faster.

After concentrating the milk/cream blend, appropriate emulsifier/stabilizer blend (0.4 pounds) and sweetening agent (16 pounds sucrose) were added to the concentrate and mixed at a temperature of approximately 56° C. This ice cream mix was homogenized by two-stage homogenization with a total pressure of 3000 pounds per square inch.

The homogenized ice cream mix was then heat-processed by continuous ultra-high temperature heating by steam injection to 140° C. for 4 seconds, followed by flash evaporation/cooling to approximately 59° C. This cooled commercially-sterilized ice cream mix was subjected to a second optional homogenization step by an in-line homogenizer in two stages at a total of 2500 pounds per square inch pressure. The ice cream mix was cooled and aseptically packaged at 10° C. in pre-sterilized 5-gallon plastic bags and stored at room temperature.

The commercially-sterile ice cream mix was used to manufacture unflavored ice cream by batch freezing. The ice cream mix was added to a sanitized batch freezer that holds approximately 23 pounds of ice cream mix. Ice cream manufacture proceeded normally with a 56% overrun attained. The frozen ice cream was packaged in paper ice cream cartons and placed in an ice cream hardening room at approximately −35° C.

The commercially-sterile ice cream mix was stored for approximately three (3) weeks at room temperature and another batch of unflavored ice cream was manufactured in a batch freezer. The ice cream mix froze adequately with an approximate 80% overrun achieved. The frozen ice cream was packaged in paper ice cream cartons and placed in an ice cream hardening room at approximately −35° C. The ice cream had normal appearance and physico-chemical properties.

What is claimed:

1. Method for manufacturing ice cream mix comprising the steps of:

adjusting the fat content and non-fat milk solids of milk to produce an adjusted milk;

concentrating said adjusted milk by reverse osmosis to produce a concentrated adjusted milk;

adding to said concentrated adjusted milk a defined amount of at least one food additive to produce an ice cream mix;

commercially sterilizing said ice cream mix at an ultra-high temperature and for a sufficiently long holding time to produce a commercially sterile ice cream mix; and packaging said commercially sterile ice cream mix under aseptic conditions in a pre-sterilized container for storage under non-refrigerated conditions.

2. A method as set forth in claim 1, wherein the ultra-high temperature is at least 138° C.

3. A method as set forth in claim 1, wherein the holding time for commercial sterilization is two seconds.

4. A method as set forth in claim 1, wherein the food additive is an emulsifier.

5. A method as set forth in claim 1, wherein the food additive is a stabilizer.

6. A method as set forth in claim 1, wherein the food additive is a sweetening agent.

7. A method as set forth in claim 1, wherein the food additive is a flavor.

8. A method as set forth in claim 1, wherein the food additive is a coloring agent.

* * * * *